Patented Oct. 21, 1941

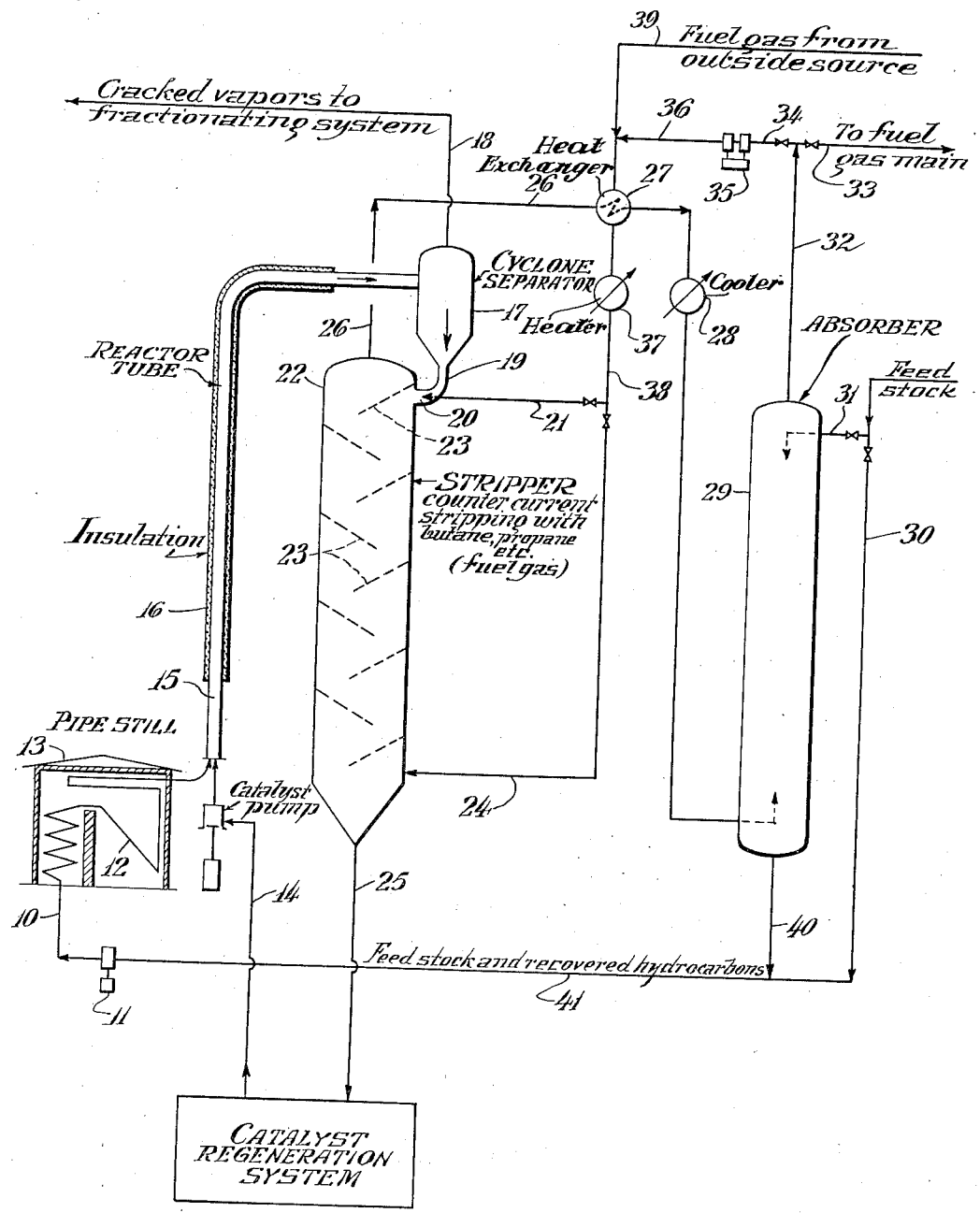

2,259,486

UNITED STATES PATENT OFFICE 2,259,486

CATALYST PURGING

Morris T. Carpenter, Chicago, Ill., assignor to Standard Oil Company, Chicago, Ill., a corporation of Indiana Application September 13, 1939, Serial No. 294,777

8 Claims. (Cl. 196—52)

The invention relates to the purging of catalyst material used in hydrocarbon conversion processes and it pertains more particularly to improved methods for the purging of powdered catalyst materials used in catalytic cracking, reforming, dehydrogenation, aromatization, alkylation, isomerization, polymerization, etc.

In many catalytic hydrocarbon conversion processes employing solid catalysts such catalysts gradually lose their effectiveness due to the deposit thereon of carbonaceous materials and it is therefore necessary to regenerate the catalyst by the removal of such deposits. I have discovered that these so-called carbonaceous deposits contain relatively large amounts of normally liquid hydrocarbons and that unless such hydrocarbons are recovered prior to the regeneration step the total losses may be so great as to render the conversion system economically undesirable. An object of my invention is to minimize hydrocarbon losses incident to catalyst regeneration. A further object is to minimize the amount of regeneration required and to minimize the problems of temperature control and heat utilization in the regeneration step.

An important object of the invention is to increase the effectiveness and efficiency of catalyst purging. A further object is to provide an improved purging medium for removing adherent oil from catalyst material prior to catalyst regeneration. A further object is to utilize improved means for recovering normally liquid hydrocarbons from the purging gas. A further object is to provide an improved method for utilizing fuel gases from extraneous sources for purging spent catalyst material and to provide the proper heat balances and operating conditions for utilizing such fuel gases most effectively. Other objects will be apparent as the detailed description of the invention proceeds.

For certain catalysts the use of steam as a stripping or purging agent is objectionable because of its deleterious effect on the catalyst and/or because of the expense involved. Furthermore, the use of steam, particularly in powdered catalyst systems is expensive because of the very large quantities of steam which are required. I have discovered that normally gaseous hydrocarbons of the type commonly found in natural gas and refinery gases are remarkably effective in removing adherent hydrocarbon oils from the catalyst surfaces particularly when employed at temperatures which are approximately the same or slightly lower than reaction temperatures. Such gases may consist of a mixture of $C_1$ to $C_4$ hydrocarbons or ordinary fuel gas which is common in all refineries.

In practicing my invention I employ hot hydrocarbon gases of this type at elevated temperatures for removing entrained and adherent oil from spent catalyst prior to regeneration. The invention is particularly applicable to powdered catalyst systems wherein I may utilize the hydrocarbon purging gases for injecting powdered catalyst into a stripping column and instantaneously removing therefrom most of the oil which, if allowed to remain on the catalyst, would result in further decomposition and coke deposits. I then pass the catalyst which is substantially freed from liquid hydrocarbons through a tower countercurrent to further amounts of the heated hydrocarbon purge gases for substantially drying the catalyst material and quantitatively removing adherent oil therefrom. The tower is preferably equipped with downwardly sloping baffles.

The hydrocarbons which are removed from the catalyst are recovered in an absorption system which preferably utilizes incoming feed stock as a scrubbing liquid. The scrubbed fuel gases may then be recycled through heat exchange and heating means for purging further amounts of catalyst.

The use of hydrocarbon purge gases in the concurrent and countercurrent steps hereinabove referred to not only greatly increases the efficiency and effectiveness of the purging but minimizes the time required for purging and the amount of purging gas required. Overall yields from the conversion process are materially increased, losses to coke are decreased and the expense of purging and oil recovery is reduced to a minimum.

The invention will be more clearly understood from the following detailed description read in connection with the accompanying drawing which forms a part of this specification and in which the single figure is a schematic flow diagram of a powdered catalyst conversion system for catalytic cracking.

While the invention is described in connection with catalytic cracking it should be understood that it is equally applicable to catalytic reforming, aromatization, dehydrogenation, desulfurization, alkylation, polymerization, etc., in fact to any hydrocarbon conversion process employing powdered catalysts which require periodic regeneration by oxidation.

The nature of the charging stock will depend, of course, upon the particular conversion process employed; in the case of cracking I may use, for example, a Mid-Continent, West Texas or East Texas gas oil.

Referring to the drawing, such gas oil is charged through line 10 by pump 11 to coils 12 of pipe still 13 wherein it is heated to a temperature of about 800° to 1000° F., preferably about 850 to 950° F. under a pressure of about atmospheric to 50 pounds, for example about 25 pounds per square inch. Powdered catalyst is injected into the hot vapors through line 14 by means of super-heated steam or by any other conventional injection system being metered by a pump or the equivalent. It should be understood, of course, that the powdered catalyst may be introduced as a slurry into the oil entering the pipe still. The particular method of powdered catalyst introduction forms no part of the present invention and it will not be described in further detail.

The ratio of catalyst to liquid charging stock may vary from about 0.5 to 15, depending upon the nature of the catalyst, nature of the charging stock and the desired degree of conversion, the preferred ratio being about 0.5 or 6 volumes of catalyst per volume of oil, except that in order to prevent the temperature from rising too high in the regeneration step it is sometimes desirable to use from 8 to 15 volumes of catalyst per volume of oil. The velocity of vapor flow is sufficient to carry the catalyst in the vapor stream through reactor 15 which is preferably covered with suitable insulating materials 16. The time of contact in the reactor may vary over a fairly wide range but I prefer to employ a feed rate of about 0.1 to 4 volumes of oil (liquid basis) per reactor volume per hour.

The catalyst may be of the clay type, i. e. activated fuller's earth or acid-treated clays of the type commonly employed for decolorizing oils. Alternatively, the catalyst may be of the silica-alumina type prepared by depositing alumina on silica gel. Catalysts of this type are well known in the art and a detailed description of their composition and method of preparation is therefore unnecessary. It should be understood, however, that I contemplate the use of any known catalyst material, particularly of the clay type or the silica-alumina type wherein metal oxides are adsorbed on, incorporated in or admixed with silica gel. The catalyst should be in powdered form so that it may be suspended in gases or vapors and it preferably contains small amounts of water or steam.

When the invention is applied to dehydrogenation, aromatization or reforming my preferred catalyst is alumina with small amounts of VI group oxides such as chromium oxide, molybdenum oxide, etc. deposited thereon. Here again the specific catalyst forms no part of the invention and it will not be necessary to describe it in further detail.

The reactor tube 15 discharges into cyclone separator 17 from which cracked vapors are removed overhead through line 18 to a suitable fractionating system of any conventional type. If any catalyst remains entrained in these vapors an electrostatic precipitator may be included in line 18 or the remaining catalyst may be recovered as a slurry in the fractionating equipment.

Catalyst from separator 17 (and/or from the electrical precipitator) is withdrawn through line 19 and injected by a suitable injector 20 supplied with hot fuel gases introduced by line 21 into countercurrent stripping column 22.

An important feature of the invention is the immediate removal of oil from catalyst material in the concurrent flow of the catalyst with fuel gas discharged from injector 20. The high velocity at this point assures intimate contact with catalyst material and most of the adsorbed oil is almost instantaneously removed from the powdered catalyst before it has any opportunity to undergo further decomposition.

The partially dried catalyst passes downwardly in tower 22 over inclined baffles 23 and in this tower it is countercurrently stripped with further amounts of hot fuel gas introduced through line 24. Dried catalyst leaves the base of the stripping column through line 25 for regeneration, the regenerated catalyst being returned together with any required makeup catalyst through line 14. Stripping gas may be removed from the catalyst by the use of steam or inert gas in a separate zone or chamber (not shown) if desired.

The oil-rich hot fuel gas is taken from the top of tower 22 by line 26, passed through heat exchanger 27 wherein its temperature is reduced from about 750 to 900° F. to about 200 to 400° F. and it is then passed through cooler 28 to the base of absorber 29. I may reduce the temperature of these gases in cooler 28 to about 150° F. but with a relatively tall countercurrent absorption tower hot gases may be introduced into the base thereof without unduly increasing the temperatures at the top of the absorber tower so that the heat of the oil-rich fuel gases may be imparted to the absorber oil.

This absorber oil is preferably the feed stock enroute to the conversion process. Some or all of the gas oil from line 30 may be introduced through line 31 to the top of the absorber tower and the hot enriched oil from the base of this tower is passed by line 40 and line 41 to line 10. Thus all of the oils recovered from the catalyst are returned to the system so that maximum yields and minimum losses are obtained. Furthermore, the catalyst carried by the stripping gases is also picked up by the charge enroute to the conversion chamber so that none of the catalyst is lost.

The denuded fuel gas leaves the top of absorber tower 39 through line 32 and it may be vented through a fuel gas main through line 33 or may be returned through line 34 by compressor 35, line 36, heat exchanger 27 and heater 37 to line 38 from which a portion may be introduced through line 21 to the injector 20 and another portion may be introduced through line 24 to the base of the stripping column. Fuel gas from outside sources may be introduced when required through line 39.

By using an efficient heat exchanger 27 the hot oil-rich fuel gases may be sufficiently cooled so that they may be directly introduced into the base of absorber 29 and simultaneously the lean fuel gas from line 36 may be sufficiently heated that little or no additional heat is required from heater 37. I prefer, however, to introduce the purging or stripping gas through lines 21 and 24 at a temperature which is substantially the same as the temperature of the catalyst leaving separator 17. At any rate, I prefer to maintain the temperature sufficiently high so that the catalyst which leaves tower 22 through line 25 will be at a sufficiently elevated temperature to facilitate satisfactory regeneration.

While I have described in detail a preferred embodiment of my invention it should be understood that I do not limit myself to any of the details or operating conditions hereinabove set forth since the conditions may be materially changed and other modifications employed by those skilled in the art in accordance with the above teaching and without departing from the invention.

I claim:

1. The method of purging a spent catalyst from a hydrocarbon conversion process, which method comprises continuously moving a catalyst through a stripping zone, contacting said catalyst in concurrent flow with a hot normally gaseous hydrocarbon in said stripping zone for the rapid removal of oil therefrom to produce a partially dried catalyst and then countercurrently contacting the partially dried catalyst with hot normally gaseous hydrocarbons to remove further amounts of oil therefrom.

2. The method of recovering oil from spent catalyst in a hydrocarbon conversion process, which comprises purging said catalyst with hot $C_1$ to $C_4$ hydrocarbons to form a dry catalyst material and an oil-rich gas, cooling said oil-rich gas, scrubbing said oil-rich gas with a normally liquid hydrocarbon oil, returning substantially dry gas from the scrubbing step to said purging step and introducing the scrubbing oil together with oil and catalyst scrubbed from the oil-rich gas to the conversion step.

3. The method of obtaining maximum yields and minimum losses in a hydrocarbon conversion process employing a solid catalyst which requires periodic regeneration for the removal of carbonaceous deposits, which method comprises stripping a spent catalyst with a $C_1$ to $C_4$ hydrocarbon gas at a temperature of about 750 to 950° F. to form an oil-rich gas and a substantially dry catalyst, cooling the oil-rich gas by indirect heat exchange with substantially dry $C_1$—$C_4$ hydrocarbon gas, scrubbing the cooled oil-rich $C_1$—$C_4$ hydrocarbon gas with a normally liquid hydrocarbon, introducing said scrubbing liquid together with the oil which it has absorbed to the conversion step, heating said unabsorbed $C_1$—$C_4$ gas and contacting further amounts of spent catalyst with said heated $C_1$—$C_4$ gas to form further amounts of hot, oil-rich $C_1$—$C_4$ gas.

4. In a catalytic hydrocarbon conversion process, the method of recovering oil from spent catalyst which comprises heating a dry hydrocarbon fuel gas in a heat exchanger, further heating said gas to a temperature of about 750 to 850° F., urging spent catalyst with said heated fuel gas to form a dry catalyst and a hot oil-rich fuel gas, passing said oil-rich fuel gas through said heat exchanger, removing oil from said oil-rich gas and returning the substantially oil-free gas for further heating and purging.

5. The method of claim 4 wherein the spent catalyst is in powdered form and wherein purging is effected by countercurrently contacting the powdered catalyst with the hot fuel gas.

6. The method of claim 4 wherein the catalyst is in powdered form and wherein partial purging is effected in concurrent flow and substantially instantaneously.

7. In a catalytic hydrocarbon conversion process the method of operation which comprises suspending powdered catalyst in hot hydrocarbon charging stock vapors and effecting contact of vapors with suspended catalyst in a zone of upflowing vapors, separating catalyst from reaction vapors and introducing the separated catalyst into a stripping zone, countercurrently stripping said separated catalyst at a temperature of about 750 to 950° F. with a normally gaseous hydrocarbon for recovering oil from catalyst, scrubbing the stripping gas with stock charged to the process so that recovered oil is commingled with charging stock which is vaporized and charged to the contacting step and removing dry catalyst from the base of said stripping zone.

8. In a catalytic hydrocarbon conversion process the method of operation which comprises suspending powdered catalyst in hot hydrocarbon charging stock vapors and effecting contact of vapors with suspended catalyst in a zone of up-flowing vapors, separating catalyst from reaction vapors and introducing the separated catalyst into a stripping zone, countercurrently stripping said separated catalyst at a temperature of about 750° to 950° F. with a normally gaseous hydrocarbon for recovering oil vapors therefrom, removing dry catalyst from the base of said stripping zone and contacting said recovered oil vapors together with charging stock vapors in the contacting step.

MORRIS T. CARPENTER.

CERTIFICATE OF CORRECTION.

Patent No. 2,259,486.  October 21, 1941.

MORRIS T. CARPENTER.

It is hereby certified that error appears in the printed specification of the above numbered patent requiring correction as follows: Page 3, second column, line 3, claim 4, for the word "urging" read --purging--; and that the said Letters Patent should be read with this correction therein that the same may conform to the record of the case in the Patent Office.

Signed and sealed this 2nd day of December, A. D. 1941.

(Seal)

Henry Van Arsdale,
Acting Commissioner of Patents.